(12) United States Patent
Granger

(10) Patent No.: US 6,611,346 B2
(45) Date of Patent: Aug. 26, 2003

(54) SYSTEM FOR IDENTIFYING THE POSITION OF A THREE-DIMENSIONAL MACHINE IN A FIXED FRAME OF REFERENCE

(76) Inventor: Romain Granger, 12 Chemin du Tripot, 41800 Lavardin (FR)

( * ) Notice: Subject to any disclaimer, the term of this patent is extended or adjusted under 35 U.S.C. 154(b) by 107 days.

(21) Appl. No.: 09/808,798

(22) Filed: Mar. 15, 2001

(65) Prior Publication Data

US 2001/0024283 A1 Sep. 27, 2001

(30) Foreign Application Priority Data

Mar. 21, 2000 (FR) .............................. 00 03593

(51) Int. Cl.[7] .............................................. G01B 11/14
(52) U.S. Cl. ........................ 356/620; 356/614; 901/46
(58) Field of Search ................................ 356/620, 614, 356/615, 616; 33/286, 288, 263, 264; 250/221, 222.1, 491.1, 559.29, 559.33; 700/259, 258, 245; 901/46, 47, 1

(56) References Cited

U.S. PATENT DOCUMENTS

| | | | |
|---|---|---|---|
| 2,206,036 A | * | 7/1940 | Herson ......................... 33/264 |
| 4,177,964 A | * | 12/1979 | Hujsak et al. ............... 244/161 |
| 4,295,740 A | * | 10/1981 | Sturges, Jr. ............... 356/141.3 |
| 4,617,503 A | | 10/1986 | Davis et al. ................. 318/572 |
| 5,219,036 A | | 6/1993 | Schwager et al. .......... 180/168 |
| 5,280,431 A | | 1/1994 | Summerville et al. ........ 701/24 |
| 5,305,091 A | * | 4/1994 | Gelbart et al. .............. 318/632 |
| 5,506,682 A | | 4/1996 | Pryor .......................... 356/623 |
| 5,757,499 A | * | 5/1998 | Eaton ...................... 356/141.3 |

FOREIGN PATENT DOCUMENTS

| | | |
|---|---|---|
| DE | 197 11 361 A1 | 9/1998 |
| FR | 2 669 257 | 5/1992 |

* cited by examiner

*Primary Examiner*—Thong Nguyen
*Assistant Examiner*—Arnel C. Lavarias

(57) ABSTRACT

The present invention relates to a system for identifying the position of a machine in a fixed frame of reference, said machine standing on an essentially plane support surface. In the invention, the support surface is fitted with a plurality of interactive integrated bushings, each bushing being fitted with emitter means serving to emit a predetermined code enabling the bushing concerned to be identified and thus making it possible to deduce the coordinates of a point associated with said support surface, and the three-dimensional machine is fitted with at least one articulated arm terminating in a position sensor, said arm being fitted with receiver means capable of detecting the code emitted by a bushing amongst the plurality of bushings when the associated position sensor is brought into contact therewith.

7 Claims, 2 Drawing Sheets

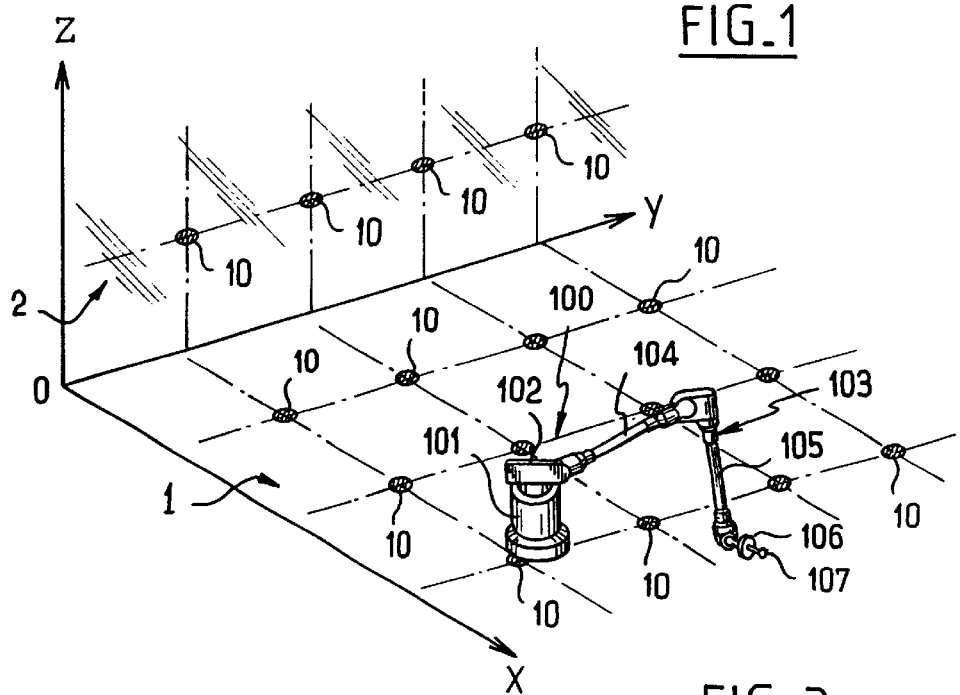
FIG.1
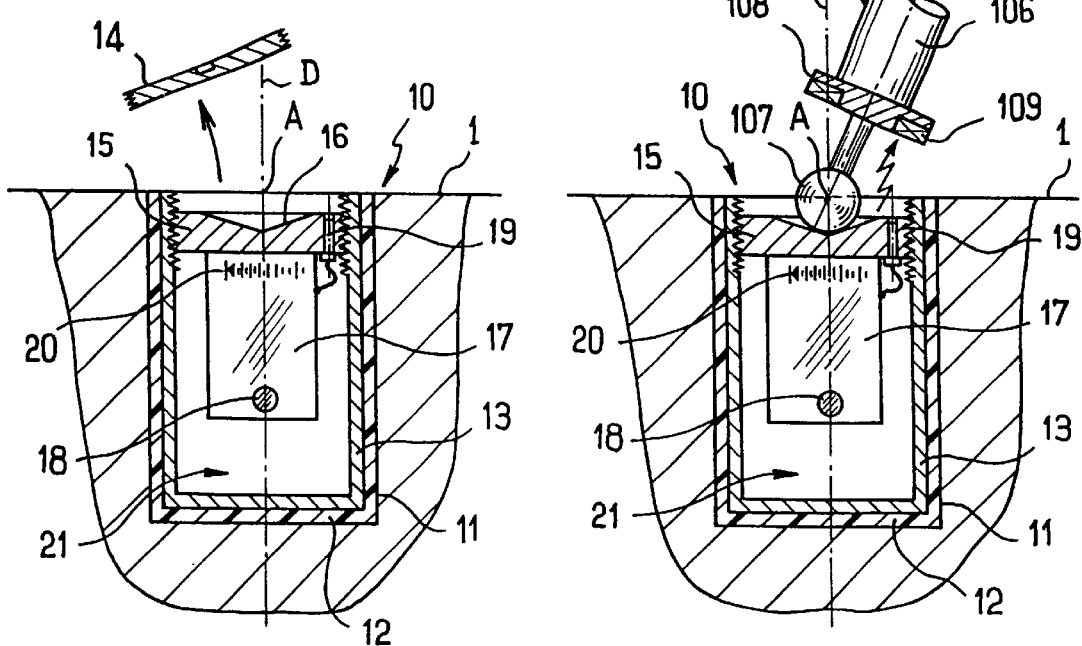
FIG.2
FIG.3

SYSTEM FOR IDENTIFYING THE POSITION OF A THREE-DIMENSIONAL MACHINE IN A FIXED FRAME OF REFERENCE

The present invention relates to a system for identifying the position of a three-dimensional machine in a fixed frame of reference.

BACKGROUND OF THE INVENTION

The three-dimensional machine concerned can equally well be a measuring machine or a machine for machining, e.g. a multi-spindle milling machine.

In the particular field of motor vehicles, it can be necessary to identify the position of various points of the bodywork of a motor vehicle that has been involved in an accident or that is being assembled, so as to monitor its shape by identifying predetermined points of said bodywork by means of a three-dimensional measuring device associated with a reference structure, commonly referred to as a "slab". It is this operation of putting the vehicle on the slab that makes it possible to decide whether it can be put back on the road, possibly after repairing its deformed portions, or whether it should be scrapped.

In this context, reference can be made to the following documents in the name of the Applicant: FR-A-2 750 546 and FR-A-2 764 992.

Systems have also been proposed for identifying position by using a transmitter module carrying a light beam source mounted on a stand that is capable of pivoting about two distinct non-parallel axes, with angular position sensors associated with the corresponding rotary movement of the source relative to the stand, a plurality of targets being placed around the transmitter module at locations that are defined relative to a fixed frame of reference, said targets being suitable for delivering electrical signals indicating that they are being illuminated by the light beam emitted by the source. One such system is described in documents WO-A-95/06479 and FR-A-2 669 257. Nevertheless, such a system is constraining insofar as it is necessary to fit the premises in which the measuring machine is to be found with a plurality of projecting targets that are distributed over the vertical walls or the ceiling, with position not being identified relative to the horizontal supporting surface.

Techniques are also known for determining the position of an article, either by means of optical devices of the camera or optical fiber type (U.S. Pat. No. 5,506,682) or by means of a vibrating bar (U.S. Pat. No. 4,617,503), and light benches for industrial metrology are also known (DE-A-197 11 361). The technological background is also illustrated by systems for guiding moving transporters by means of tracks or beacons associated with the ground (U.S. Pat. No. 5,280,431 and U.S. Pat. No. 5,219,036).

OBJECTS AND SUMMARY OF THE INVENTION

An object of the invention is to design a position identifying system that can be used equally well with a measuring machine as with a machining machine, and which is both simple and low in cost. In this context, it is recalled that conventional slabs are constituted by massive plates having dimensions of 200 millimeters (mm)×4000 mm×6000 mm, and they are extremely heavy and expensive.

According to the invention, this problem is solved by a system for identifying the position of a three-dimensional measuring or machining machine in a fixed frame of reference, said machine standing on an essentially plane support surface, wherein:

the support surface is fitted with a plurality of interactive integrated bushings, each bushing being fitted with emitter means serving to emit a predetermined code enabling the bushing in question to be identified and to deduce therefrom the coordinates of an associated point of said support surface; and the three-dimensional machine is fitted with at least one articulated arm terminated by a position sensor, said arm being fitted with receiver means capable of detecting the code emitted by a bushing amongst the plurality of bushings when the associated position sensor is brought into contact therewith.

Thus, it suffices to bring the position sensor into contact with a plurality of interactive bushings directly adjacent to the machine in order to discover easily the coordinates in three dimensions of a plurality of known points of the support surface, thus making it possible to identify the position of the machine in its frame of reference both quickly and accurately.

In a particular embodiment, at least one essentially vertical surface adjacent to the support surface is likewise fitted with a plurality of interactive integrated bushings of the same type as those fitted to said support surface.

The bushings in a given surface can be positioned so as to form at least a portion of a rectangular grid. In this respect, the array of interactive bushings can be disposed in a wide variety of arrangements without it being necessary to use a rectangular grid arrangement as is the case in particular for conventional slabs where the top bearing surface presents orthogonal grooves which cross at identified points.

Preferably, each bushing comprises a housing integrated in a drilling in the associated surface, said housing containing the emitter means and a position-identifying cone whose axis passes through the identified point associated with said surface. Then, in particular, the emitter means of each bushing is constituted by an infrared emitter associated with an electronics card which is housed in the housing of said bushing.

It is also possible to provide for the position-identifying cone to form a portion of a threaded washer which supports the emitter, said washer being positioned in the housing of the bushing in such a manner that the position sensor is centered on the associated point when it is pressed home in said position-identifying cone.

In which case, advantageously, the washer includes a switch associated with the emitter so that said emitter is active only when the position sensor is pressed home against the position-identifying cone.

Also advantageously, the housing of each bushing can be closed by a removable cover which, in the closed position, lies flush with the plane of the associated surface. Thus, the bushings of the plurality of bushings fitted to the associated surface are fully integrated in said surface and do not provide any impediment to being passed over so long as the bushings are not actually in use.

Finally, and preferably, the coordinates of the position-identifying point of each of the bushings in use are entered in association with the corresponding identity code in a common table, preferably in the memory of an associated processing computer.

BRIEF DESCRIPTION OF THE DRAWINGS

Other characteristics and advantages of the invention will appear more clearly in the light of the following description and from the accompanying drawings relating to a particular embodiment, and with reference to the figures in which:

FIG. 1 is a perspective view showing a position-identifying system of the invention, associated in this case with a three-dimensional measuring machine, using interactive bushings integrated in the floor and in an adjacent vertical wall;

FIG. 2 is a fragmentary section through one of the interactive bushings of the preceding system;

FIG. 3 is a section analogous to that of FIG. 2, showing co-operation between the position sensor fitted to the three-dimensional machine and the interactive bushing, with a corresponding code being emitted.

MORE DETAILED DESCRIPTION

Figure 4:
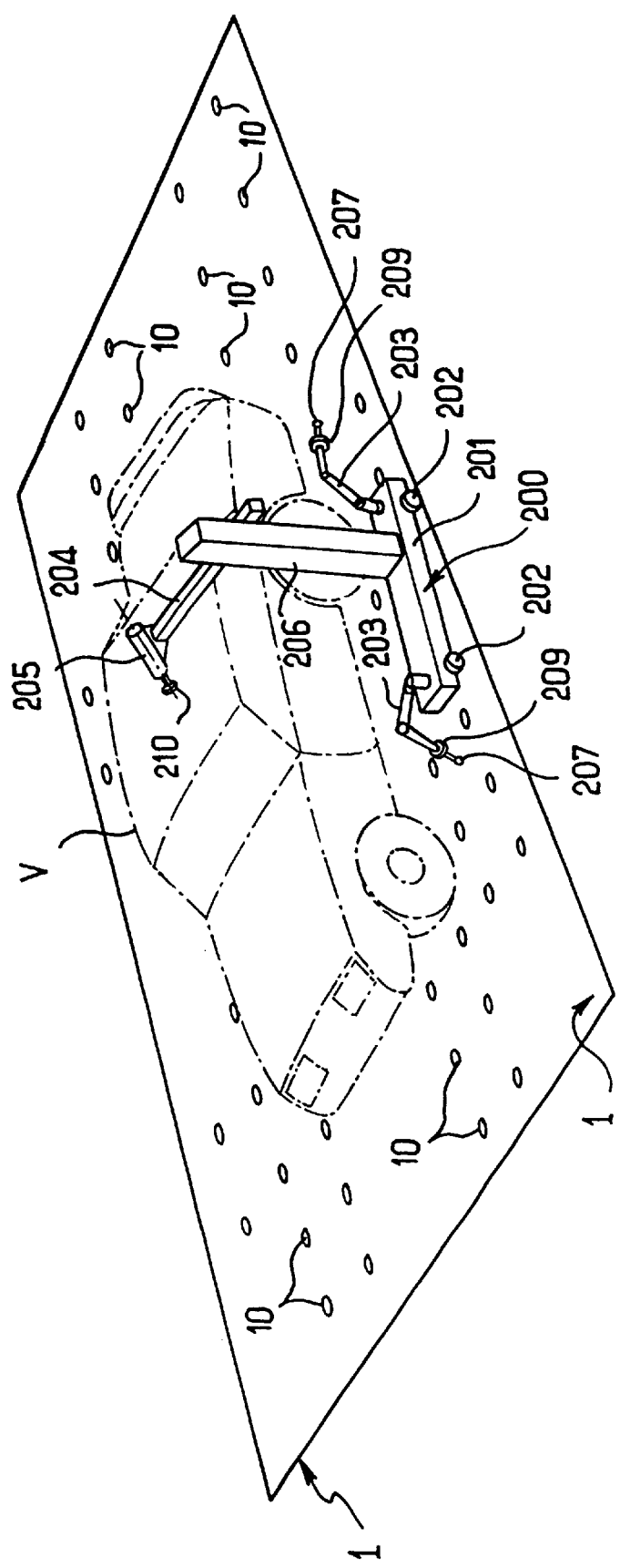
FIG. 4 is a perspective view showing a motor vehicle repair or assembly bench, the vehicle being represented in chain-dotted lines only, with the position-identifying system of the invention being associated with a three-dimensional machining machine, such as a multi-spindle milling machine.

FIG. 1 shows a position-identifying system of the invention, in this case associated with a three-dimensional measuring machine 100, in a fixed frame of reference that is defined in three dimensions by three rectangular axes OX, OY, OZ. The three-dimensional machine 100 stands on an essentially plane support surface 1 which in this case is substantially horizontal. This surface is adjacent to another surface 2 which is essentially vertical.

In accordance with an essential characteristic of the invention, the support surface 1, and in this case also the vertical surface 2, are each fitted with a plurality of interactive integrated bushings 10, each bushing being fitted with emitter means for emitting a predetermined code that identifies the bushing concerned, thus making it possible to deduce the three-dimensional coordinates of a point associated with said support surface. An advantageous example of the structure for such an interactive integrated bushing is described below in greater detail with reference to FIGS. 2 and 3.

FIG. 1 also shows a three-dimensional machine 100 which in this case is constituted by a measuring machine comprising a base 101 having a pivoting turret 102 mounted on the top thereof and carrying an articulated arm assembly 103. The arm assembly 103 is constituted in this case by two arms 104 and 105 and by a terminal finger 106 fitted at its free end with a feeler or position sensor 107 (generally implemented in the form of a ball). The movements of the various joints of the articulated assembly 103 and the pivoting of the turret 102 are measured by associated encoders (not shown in the figure) whose signals are conveyed to an electronic processor unit (not shown) such as a computer, where they are combined to deduce the position of the feeler 107 in three dimensions relative to the base 101. The particular way in which this kind of measuring machine is made is well known in itself and is therefore not described further herein.

As described below with reference to FIG. 3, the articulated assembly 103 is also fitted with receiver means capable of detecting the code emitted by a bushing forming one out of a plurality of bushings 10 whenever the position sensor or feeler 107 is brought into contact therewith.

Thus, for each bushing 10 of number i, the associated emitter gives an identity code which states that this is bushing number i, thus making it possible to deduce the coordinates Xi, Yi, Zi of a point associated with the support surface 1 or 2. It will easily be understood that by taking a plurality of measurements, bringing the feeler 107 successively into register with a plurality of bushings that are directly accessible by moving the articulated arm 103 without moving the support of the machine, a series of very precise measurements is obtained from which it is easy to deduce accurately the position of the stand of the machine, and to do within a three-dimensional frame of reference. The coordinates Xi, Yi, Zi taken from each bushing numbered i are combined with the angle data obtained from the various encoders fitted to each of the joints of the three-dimensional machine 100 so as to deduce the position of the machine in the OX, OY, OZ frame of reference. In practice, these coordinates Xi, Yi, Zi are entered together with the corresponding identity code in association with bushing number i in a common table which is preferably located in the memory of an associated processing computer (not shown herein).

Thus, by fitting one or more surfaces with a plurality of such bushings 10, it is possible to make a virtual slab which can be used at any time, or ignored for some other application. There is thus no longer any need to provide a physical slab located in repair or assembly premises insofar as it suffices to use the floor of said premises. This constitutes considerable simplification in various fields of application, and in particular that which is associated with motor vehicles.

The structure of one of the interactive bushings 10 forming part of the plurality of bushings fitted to the support surface(s) is described below in greater detail with reference to FIG. 2.

In this figure, it can be seen that the surface 1 has a drilling 11 in which a housing 13 is placed, in this case a housing in the form of a cylinder about an axis D. The housing 13 is positioned in its blind drilled hole in stationary manner that is accurately identified by interposing a thickness 12 of cement or adhesive. The housing 13 integrated in the drilling 11 in the surface 1 contains emitter means referenced 19 and a position-identifying cone 16 on the axis D, passing through the identified point associated with said wall and which is referenced A.

Specifically, the emitter means 19 of each bushing 10 is constituted by an infrared emitter associated with an electronics card referenced 17 that is received inside the housing 13 of said bushing, in the inside space 21 of said housing. The electronics card 17 is fitted with a battery 18 in conventional manner and in this case it is fixed to the bottom portion of a threaded washer 15 forming part of the position-identifying cone 16, said washer carrying the emitter 19 in this case. The inside thread of the top portion of the housing 13 makes it possible to position the washer 15 in the housing 13 accurately along the axis thereof so that the position sensor or feeler 107 is accurately centered on the associated point A when it is pushed home into the position-identifying cone 16, as illustrated in FIG. 3.

In practice, the housing 13 of each bushing 10 can be closed by a removable cover 14 which, in its closed position, lies flush with the plane of the associated surface 1 or 2.

In FIG. 2, there can be seen a cover 14 whose periphery is threaded so as to screw directly into the housing 13, and which has just been removed as symbolized by the arrow.

In FIG. 3, the feeler or position sensor 107 is associated with the finger 106 terminating the articulated arm 103 of the three-dimensional measuring machine, said sensor being spherical in shape in this case. Additional equipment 108 is provided with an infrared radiation receiver 109. When the position sensor 107 is brought to the bottom of the position-identifying cone 16, the emitter 19 emits infrared radiation in a predetermined code which is associated with the corresponding bushing 10. The code gives the identity number of the bushing concerned and makes it possible instantly to deduce therefrom the X, Y, and Z coordinates of the associated point A.

Provision can be made for the washer 15 also to include a switch (not shown herein) associated with the emitter 19 so that said emitter becomes active only when the position sensor 107 is pressed against the bottom of the position-identifying cone 16.

Reference 20 identifies a readable code printed on the electronic card 17 enabling identification to be performed reliably when the bushing is disassembled or when it is desired to change the emitter assembly. In practice, a 6-bit code can suffice.

The position-identifying system of the invention is naturally not limited in any way to one particular type of three-dimensional machine, and provision can also be made for it to be used with machines for machining, e.g. multiple-spindle milling machines.

FIG. 4 shows one such machining machine which is referenced 200. The machine 200 has a base carriage 201 which can move over the support surface 1 by means of wheels 202 which are fitted with encoders. An essentially vertical post 206 stands on the carriage 201 and carries a horizontal beam 204 with a tool support 205 mounted at the end thereof, and terminating in a suitable tool 210.

It is advantageous to be able to identify accurately the position of the center of the tool 210 in a fixed frame of reference associated with the horizontal support surface 1. To do this, the carriage 201 of the machine 200 is fitted with one or more articulated arms 203 (in this case two such arms) terminated by respective position sensors 207, such an arm being fitted as before with receiver means 209 capable of detecting the code emitted by any of the bushings 10 in the plurality of integrated interactive bushings whenever the associated position sensor is brought into contact therewith.

Thus, the machining machine 200 is brought into the vicinity of the article concerned, in this case vehicle bodywork V, represented by chain-dotted lines, and then the position sensors 207 of the articulated arms 203 are used by bringing said sensors into contact with a plurality of nearby bushings 10 by pressing said sensors against the bottoms of the position-identifying cones associated therewith. The coders integrated with the wheels 202 and the displacement sensors associated with the three-dimensional directions associated with the tool 210 then enable the position in three dimensions of the tool 210 in the fixed three-dimensional frame of reference associated with the support surface to be identified with great accuracy.

The invention is not limited to the embodiment described above, but on the contrary covers any variant using equivalent means to reproduce the essential characteristics specified above.

What is claimed is:

1. A system for identifying the position of a three-dimensional measuring or machining machine in a fixed frame of reference, said machine standing on an essentially plane support surface, wherein:

the support surface is fitted with a plurality of interactive integrated bushings, each bushing being fitted with emitter means serving to emit a predetermined code enabling the bushing in question to be identified and to deduce therefrom the coordinates of an associated point of said support surface, each of said bushings comprising a housing integrated in a drilling in an associated surface, said housing containing the emitter means and a position-identifying cone whose axis passes through the identified point associated with said surface, and wherein the position-identifying cone forms a portion of a threaded washer that supports the emitter, said washer being positioned in the housing of the bushing in such a manner that the position sensor is centered on the associated point when pressed home in said position-identifying cone; and the three-dimensional machine is fitted with at least one articulated arm terminated by a position sensor, said arm being fitted with receiver means capable of detecting the code emitted by a bushing amongst the plurality of bushings when the associated position sensor is brought into contact therewith.

2. A position-identifying system according to claim 1, wherein at least one essentially vertical surface adjacent to the support surface is likewise fitted with a plurality of interactive integrated bushings of the same type as those fitted to said support surface.

3. A position-identifying system according to claim 1, wherein the bushings in the support surface are disposed so as to form at least a portion of a rectangular grid.

4. A position-identifying system according to claim 1, wherein the emitter means of each bushing is constituted by an infrared emitter associated with an electronics card which is housed in the housing of said bushing.

5. A position-identifying system according to claim 1, wherein the washer includes a switch associated with the emitter so that said emitter is active only when the position sensor is pressed home against the position-identifying cone.

6. A position-identifying system according to claim 1, wherein the housing of each bushing can be closed by a removable cover which, in the closed position lies flush with the plane of the associated surface.

7. A position-identifying system according to claim 1, wherein the coordinates of the position-identifying point of each of the bushings in use are entered in association with the corresponding identity code in a common table, in the memory of an associated processing computer.

* * * * *